(12) United States Patent
Murakami et al.

(10) Patent No.: US 12,360,380 B2
(45) Date of Patent: Jul. 15, 2025

(54) WEARABLE DEVICE, INFORMATION PROCESSING METHOD, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventors: Kenta Murakami, Osaka (JP); Naomi Tomiyama, Kyoto (JP); Satoshi Matsui, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/665,675

(22) Filed: May 16, 2024

(65) Prior Publication Data
US 2024/0302662 A1    Sep. 12, 2024

Related U.S. Application Data

(63) Continuation of application No. PCT/JP2022/040517, filed on Oct. 28, 2022.

(30) Foreign Application Priority Data

Nov. 24, 2021 (JP) .................................. 2021-190461

(51) Int. Cl.
*G02B 27/01* (2006.01)
*G06T 7/00* (2017.01)
(Continued)

(52) U.S. Cl.
CPC ........ *G02B 27/0172* (2013.01); *G06T 7/0008* (2013.01); *G06T 7/73* (2017.01);
(Continued)

(58) Field of Classification Search
CPC ..... G02B 27/0172; G06T 7/0008; G06T 7/70; G06T 7/73; G06T 19/006;
(Continued)

(56) References Cited

U.S. PATENT DOCUMENTS 9,842,288 B1 * 12/2017 DeBates ............ G06K 7/10366
11,941,572 B1 * 3/2024 Ravichandran ......... H04W 4/38
(Continued)

FOREIGN PATENT DOCUMENTS

| JP | 2015184894 A | * 10/2015 |
| JP | 6696057 | 5/2020 |
| WO | WO-2019049643 A1 | * 3/2019 ......... G06K 9/00664 |

*Primary Examiner* — Stephen G Sherman
(74) *Attorney, Agent, or Firm* — Greenblum & Bernstein, P.L.C.

(57) ABSTRACT

The camera photographs a visual field of the user. The controller acquires an image captured by the camera, recognizes, through image recognition processing, a package that is a work target of the user and a hand of the user from the acquired image, determines whether or not the user is in a state of being about to carry a package based on a positional relationship between the recognized package and the recognized hand, and recognizes, through image recognition processing, a package ID from the acquired image in a case where it is determined that the user is in a state of being about to carry the package. The communication part receives delivery information regarding the package corresponding to the package ID from a delivery management server. The controller generates, based on the delivery information, alert information to be presented to the user, and outputs the generated alert information.

11 Claims, 15 Drawing Sheets

(51) Int. Cl.
    *G06T 7/73*          (2017.01)
    *G06T 19/00*        (2011.01)
    *G06V 20/80*        (2022.01)
    *G06V 40/10*        (2022.01)

(52) U.S. Cl.
    CPC ............ *G06T 19/006* (2013.01); *G06V 20/80* (2022.01); *G06V 40/11* (2022.01); *G06T 2207/10004* (2013.01)

(58) Field of Classification Search
    CPC . G06T 2207/10004; G06T 2207/20081; G06T 2207/20084; G06V 20/80; G06V 20/20; G06V 40/11; G06Q 10/08
    See application file for complete search history.

(56) References Cited

U.S. PATENT DOCUMENTS

| | | | |
|---|---|---|---|
| 2015/0192774 A1* | 7/2015 | Watanabe | G06Q 10/08 345/8 |
| 2017/0161957 A1* | 6/2017 | Yajima | G06V 20/20 |
| 2019/0122174 A1* | 4/2019 | Gil | G06Q 10/0833 |
| 2020/0272969 A1 | 8/2020 | Yoshida | |

* cited by examiner

FIG.3

| PACKAGE ID | ADDRESSEE INFORMATION | DESTINATION INFORMATION | PACKAGE TYPE INFORMATION | REDELIVERY FLAG | REDELIVERY DESIRED DATE AND TIME | ABSENCE FLAG |
|---|---|---|---|---|---|---|
| 1234-5678-90 | XXXX | 5710000 KADOMA CITY, OSAKA··· | FRAGILE ARTICLE | ON | 2021/09/20 9:00-12:00 | OFF |
| 0123-4567-89 | YYYY | 5500000 OSAKA CITY, OSAKA··· | FOOD PRODUCT | OFF | — | ON |
| ⋮ | ⋮ | ⋮ | ⋮ | ⋮ | ⋮ | ⋮ |

WEARABLE DEVICE, INFORMATION PROCESSING METHOD, AND NON-TRANSITORY COMPUTER READABLE RECORDING MEDIUM STORING INFORMATION PROCESSING PROGRAM

FIELD OF INVENTION

The present disclosure relates to a technique for supporting carrying work of a package by the user.

BACKGROUND ART

For example, in Patent Literature 1, smart glasses read a product code from a two-dimensional code included in a captured image acquired from a camera, and transmits the read product code, a work type, and a worker code of a worker to a server device. The server device refers to a call attention table, determines whether or not a condition of a product code, a work type, and a proficiency level is met, and, in a case where attention information meeting the condition is stored, identifies the attention information, a period, and an output timing, and transmits instruction information and the attention information to the smart glasses. Upon receiving the instruction information and the attention information, the smart glasses perform control to display the instruction information on a display, refers to the period and the output timing, and performs control to display the attention information on the display at an appropriate timing.

However, in the conventional technique described above, attention information is not always presented at a time point where a worker is about to carry a package, and further improvement has been required.

Patent Literature 1: JP 6696057 B2

SUMMARY OF THE INVENTION

The present disclosure has been made to solve the above problem, and an object of the present invention is to provide a technique capable of reducing delivery errors and delivery loss and improving delivery efficiency.

A wearable device according to the present disclosure is a wearable device worn on a head of a user, the wearable device including a camera, a controller, and a communication part. The camera photographs a visual field of the user. The controller acquires an image captured by the camera, recognizes a package as a work target of the user and a hand of the user from the acquired image by image recognition processing, determines whether or not the user is in a state of being about to carry the package based on a positional relationship between the recognized package and the recognized hand, and recognizes a package ID for identifying the package from the acquired image by image recognition processing in a case where it is determined that the user is in a state of being about to carry the package. The communication part transmits, to a delivery management server, a delivery information request for requesting delivery information regarding the package corresponding to the recognized package ID, and receives the requested delivery information from the delivery management server. The controller generates alert information to be presented to the user based on the received delivery information, and outputs the generated alert information.

According to the present disclosure, since alert information is presented at a time point where the user is about to carry a package, it is possible to reduce delivery errors and delivery loss and improve delivery efficiency.

BRIEF DESCRIPTION OF THE DRAWINGS

FIG. 3 is a diagram illustrating an example of delivery information according to the present first embodiment.

DETAILED DESCRIPTION (Knowledge Underlying Present Disclosure)

Figure 1:
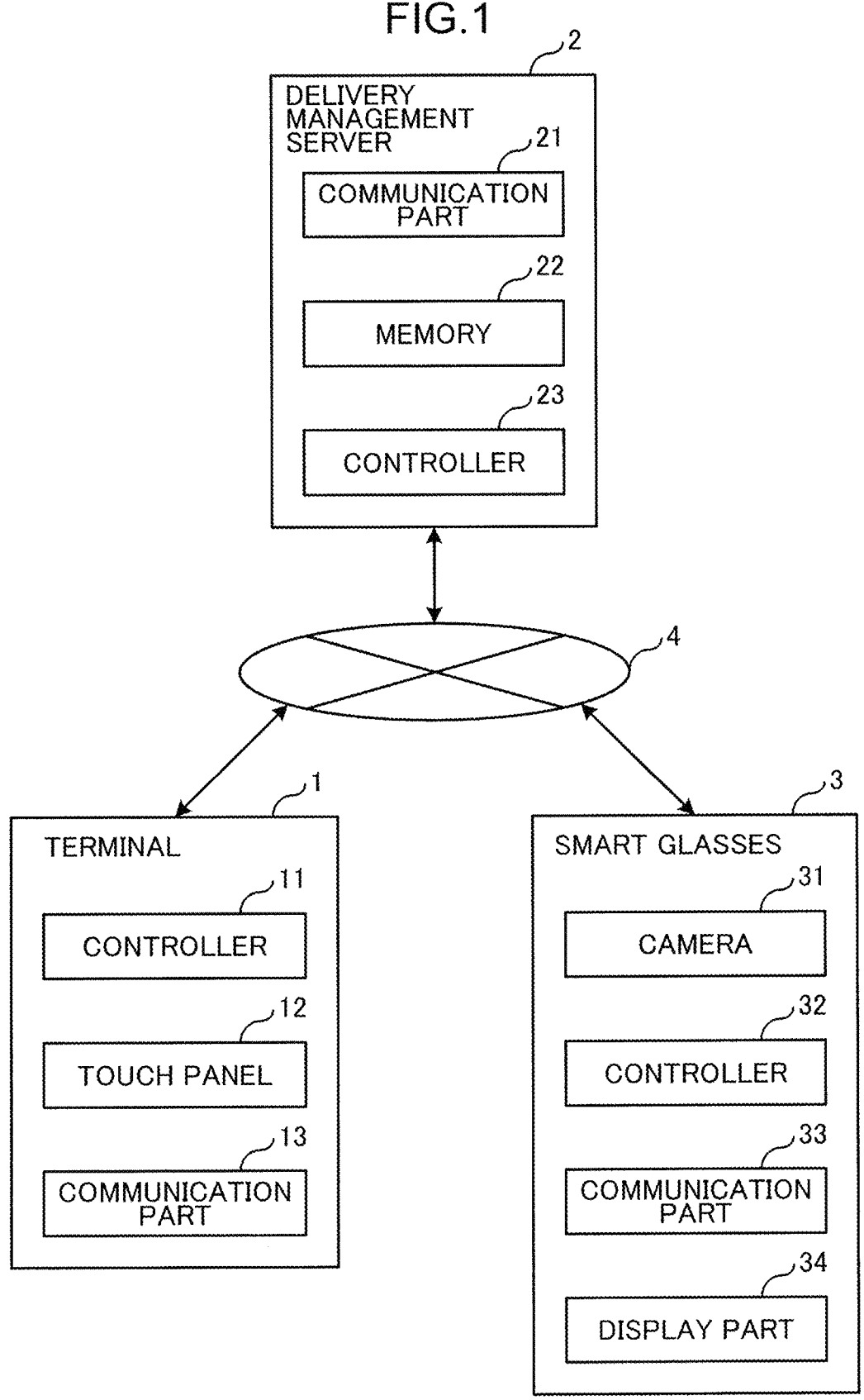
FIG. 1 is a diagram illustrating an example of a configuration of a delivery system according to a first embodiment of the present disclosure.

In the above-described conventional technique, a captured image in a line-of-sight direction of a worker is acquired by a camera provided in the smart glasses, a product code of a package is acquired from the acquired captured image, and attention information corresponding to the product code is displayed on a display provided in the smart glasses. Therefore, a display timing of attention information depends on movement of a line of sight of the worker. For this reason, in the conventional technique, attention information is not always displayed at a time point where a worker is about to carry a package.

In order to solve the above problem, a technique below is disclosed.

(1) A wearable device according to one aspect of the present disclosure is a wearable device worn on a head of a user, the wearable device including a camera, a controller, and a communication part. The camera photographs a visual field of the user. The controller acquires an image captured by the camera, recognizes a package as a work target of the user and a hand of the user from the acquired image by image recognition processing, determines whether or not the user is in a state of being about to carry the package based on a positional relationship between the recognized package and the recognized hand, and recognizes a package ID for identifying the package from the acquired image by image recognition processing in a case where it is determined that the user is in a state of being about to carry the package. The communication part transmits, to a delivery management server, a delivery information request for requesting delivery information regarding the package corresponding to the recognized package ID, and receives the requested delivery information from the delivery management server. The controller generates alert information to be presented to the user based on the received delivery information, and outputs the generated alert information.

According to this configuration, a package as a work target of the user and a hand of the user are recognized by image recognition processing from an image indicating a visual field of the user captured by the camera, and whether or not the user is in a state of being about to carry the package is determined based on a positional relationship between the recognized package and the recognized hand. Then, in a case where it is determined that the user is in a state of being about to carry a package, alert information to be presented to the user is generated based on delivery information regarding the package, and the generated alert information is output.

Therefore, since alert information is presented when the user is about to carry a package, it is possible to reduce delivery errors and delivery loss and improve delivery efficiency.

(2) In the wearable device according to (1) described above, the controller may determine that the user is in a state of being about to carry the package in a case where the recognized package is located between a position of a recognized right hand of the user and a position of a recognized left hand of the user.

In a case where the user is about to carry a package, since the user grips the package with both hands, the package exists between the right hand and the left hand of the user. For this reason, by determining whether or not a recognized package is located between a position of a recognized right hand of the user and a position of a recognized left hand of the user, it is possible to easily determine whether or not the user is in a state of being about to carry the package.

(3) In the wearable device according to (1) or (2) described above, the delivery information may include redelivery information indicating whether or not redelivery is requested for the package or absence information indicating whether or not a recipient of the package is absent on a scheduled delivery date of the package, the delivery management server may update the redelivery information or the absence information with respect to the package ID, and the controller may generate the alert information in a case where the redelivery information included in the received delivery information indicates that the redelivery is requested, or in a case where the absence information included in the received delivery information indicates that the recipient is absent on the scheduled delivery date.

According to this configuration, in a case where redelivery information included in delivery information indicates that redelivery is requested, or in a case where absence information included in delivery information indicates that a recipient is absent on a scheduled delivery date, alert information is generated. Therefore, in a case where redelivery is requested for a package that the user is about to carry, or in a case where a recipient of the package that the user is about to carry is absent on a scheduled delivery date, alert information can be presented to the user.

(4) In the wearable device according to (3) described above, the delivery information may include a redelivery desired date and time indicating a date and time when a recipient desires redelivery of the package, and the controller may determine a loading place where the package is loaded based on the redelivery desired date and time included in the received delivery information and a current date and time in a case where the redelivery information included in the received delivery information indicates that the redelivery is requested, generate loading place presentation information for presenting the determined loading place to the user, and output the generated loading place presentation information.

According to this configuration, in a case where redelivery is requested for a package that the user is about to carry, a loading place where the package is loaded can be further presented to the user based on a redelivery desired date and time included in delivery information and a current date and time.

(5) The wearable device according to (1) or (2) described above may further include a current position acquisition part that acquires a current position of the wearable device, and the delivery information may include destination information indicating a destination of the package, and the controller may generate the alert information in a case where a position of the destination indicated by the destination information included in the received delivery information and the current position acquired by the current position acquisition part are separated from each other by a predetermined distance or more.

According to this configuration, in a case where a position of a destination indicated by destination information included in delivery information is separated from an acquired current position by a predetermined distance or more, alert information is generated. Therefore, it is possible to notify the user that a package that the user is about to carry is incorrect, and it is possible to prevent the package from being erroneously delivered.

(6) The wearable device according to (1) to (5) described above may further include a display part, and the controller may output the alert information to the display part, and the display part may display the alert information as augmented reality in a visual field of the user.

According to this configuration, alert information is output to the display part, and the alert information is displayed as augmented reality in a visual field of the user by the display part, so that the user can check the alert information while carrying a package.

(7) The wearable device according to any one of (1) to (6) described above may further include a speaker, and the controller may output the alert information to the speaker, and the speaker may output the alert information by voice.

According to this configuration, since alert information is output to the speaker and the alert information is output by voice by the speaker, the user can check the alert information while carrying a package.

(8) In the wearable device according to any one of (1) to (7) described above, the controller may determine whether or not the user releases the hand from the package based on a positional relationship between the recognized package and the recognized hand, and stop output of the alert information in a case where it is determined that the user releases the hand from the package.

According to this configuration, in a case where the user releases a hand from a package after alert information is output, output of the alert information is stopped, and thus, it is possible to end the presentation of the alert information at a time point where the user releases the hand from the package.

(9) In the wearable device according to any one of (1) to (8) described above, the controller may generate recognized package presentation information for presenting the recognized package to the user in an identifiable manner, and output the generated recognized package presentation information.

According to this configuration, recognized package presentation information for presenting a recognized package to the user in an identifiable manner is generated, and the generated recognized package presentation information is output. Therefore, it is possible to prevent a package that is not a work target from being erroneously recognized as a package that the user is about to carry by the wearable device.

Further, the present disclosure can be realized not only as the wearable device having the characteristic configuration as described above but also as an information processing method for executing characteristic processing corresponding to the characteristic configuration included in the wearable device. Further, the present disclosure can also be implemented as a computer program that causes a computer to execute characteristic processing included in the information processing method described above. Therefore, also in another aspect described below, the same effect as that of the above-described wearable device can be obtained.

(10) An information processing method according to another aspect of the present disclosure is an information processing method in a wearable device worn on a head of a user. The information processing method includes acquiring an image captured by a camera that photographs a visual field of the user, recognizing a package as a work target of the user and a hand of the user from the acquired image by image recognition processing, determining whether or not the user is in a state of being about to carry the package based on a positional relationship between the recognized package and the recognized hand, recognizing a package ID for identifying the package from the acquired image by image recognition processing in a case where it is determined that the user is in a state of being about to carry the package, transmitting, to a delivery management server, a delivery information request for requesting delivery information regarding the package corresponding to the recognized package ID, receiving the requested delivery information from the delivery management server, generating alert information to be presented to the user based on the received delivery information, and outputting the generated alert information.

(11) An information processing program according to another aspect of the present disclosure causes a computer to function to acquire an image captured by a camera that photographs a visual field of the user, recognize a package as a work target of the user and a hand of the user from the acquired image by image recognition processing, determine whether or not the user is in a state of being about to carry the package based on a positional relationship between the recognized package and the recognized hand, recognize a package ID for identifying the package from the acquired image by image recognition processing in a case where it is determined that the user is in a state of being about to carry the package, transmit, to a delivery management server, a delivery information request for requesting delivery information regarding the package corresponding to the recognized package ID, receive the requested delivery information from the delivery management server, generate alert information to be presented to the user based on the received delivery information, and output the generated alert information.

(12) A non-transitory computer readable recording medium storing an information processing program according to another aspect of the present disclosure causes a computer to function to acquire an image captured by a camera that photographs a visual field of the user, recognize a package as a work target of the user and a hand of the user from the acquired image by image recognition processing, determine whether or not the user is in a state of being about to carry the package based on a positional relationship between the recognized package and the recognized hand, recognize a package ID for identifying the package from the acquired image by image recognition processing in a case where it is determined that the user is in a state of being about to carry the package, transmit, to a delivery management server, a delivery information request for requesting delivery information regarding the package corresponding to the recognized package ID, receive the requested delivery information from the delivery management server, generate alert information to be presented to the user based on the received delivery information, and output the generated alert information.

An embodiment of the present disclosure will be described below with reference to the accompanying drawings. Note that the embodiment below is an example of embodiment of the present disclosure, and is not intended to limit the technical scope of the present disclosure.

First Embodiment

Figure 2:
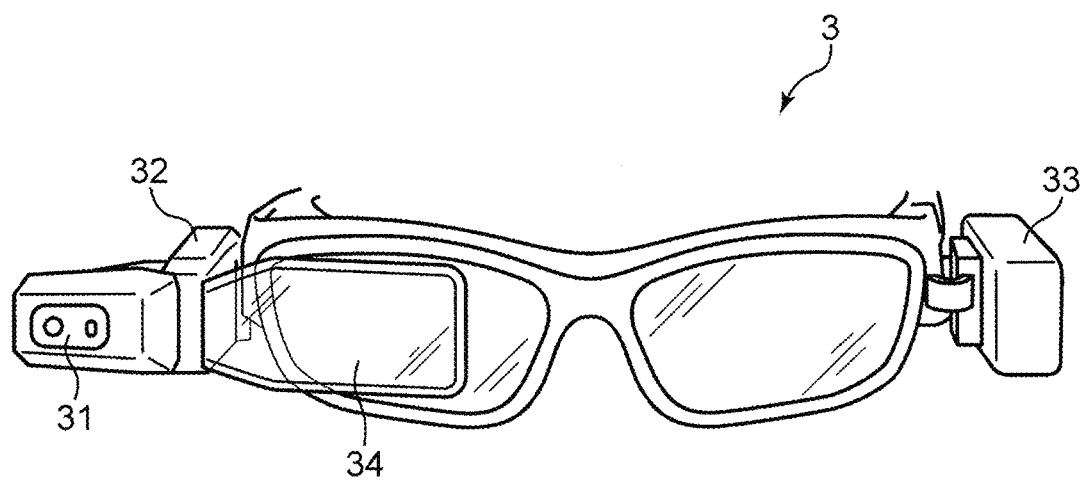
FIG. 2 is a diagram illustrating an appearance of smart glasses illustrated in FIG. 1.

FIG. 1 is a diagram illustrating an example of a configuration of a delivery system according to a first embodiment of the present disclosure, and FIG. 2 is a diagram illustrating an appearance of smart glasses 3 illustrated in FIG. 1. The delivery system illustrated in FIG. 1 includes a terminal 1, a delivery management server 2, and the smart glasses 3.

The terminal 1 is, for example, a smartphone, a tablet computer, or a personal computer, and is used by a recipient of a package. The terminal 1 includes a controller 11, a touch panel 12, and a communication part 13.

The controller 11 is, for example, a central processing unit (CPU), and controls the entire terminal 1. The controller 11 causes the touch panel 12 to display a redelivery receiving screen for receiving a request for redelivery of a package, and causes the touch panel 12 to display an absence input receiving screen for receiving input as to whether or not a recipient of a package is absent on a scheduled delivery date of the package.

The touch panel 12 displays various types of information and receives input operation by a recipient. On the redelivery receiving screen, the touch panel 12 receives a request for redelivery by the recipient and receives input of a date and time at which redelivery is desired by the recipient. The recipient inputs, to the touch panel 12, a package ID of a package that could not be received, an instruction to request redelivery, and a date and time at which redelivery is desired.

Further, the touch panel 12 receives input indicating that a recipient is absent on a scheduled delivery date on the absence input receiving screen. In a case where the recipient is absent on a scheduled delivery date of a package and cannot receive the package, the recipient inputs, to the touch panel 12, that the recipient is absent on the scheduled delivery date.

When a request for redelivery is received by the touch panel 12, the communication part 13 transmits, to the delivery management server 2, redelivery request information including a package ID and a redelivery desired date and time for requesting redelivery of a package. Further, in a case where input indicating that a recipient is absent on a scheduled delivery date is received by the touch panel 12, the communication part 13 transmits absence notification information for notifying that the recipient is absent on the scheduled delivery date to the delivery management server 2.

The delivery management server 2 manages a delivery status of a package. The delivery management server 2 manages delivery information regarding a package, and transmits the delivery information to the smart glasses 3 in response to a delivery information request from the smart glasses 3.

The delivery management server 2 is communicably connected to each of the terminal 1 and the smart glasses 3 via a network 4. The network 4 is the Internet, for example.

The delivery management server 2 includes a communication part 21, a memory 22, and a controller 23.

The communication part 21 receives redelivery request information for requesting redelivery for a package from the terminal 1. Further, the communication part 21 receives absence notification information for notifying that a recipient of a package is absent on a scheduled delivery date of the package from the terminal 1. Further, the communication part 21 receives a delivery information request for requesting delivery information from the smart glasses 3. Further, the communication part 21 transmits delivery information to the smart glasses 3 in response to a delivery information request.

The memory 22 is a storage device capable of storing various types of information, such as a random access memory (RAM), a hard disk drive (HDD), a solid state drive (SSD), or a flash memory. The memory 22 stores delivery information regarding a package.

FIG. 3 is a diagram illustrating an example of delivery information according to the present first embodiment.

The delivery information illustrated in FIG. 3 includes a package ID for identifying a package, addressee information indicating an addressee of a package, destination information indicating a destination of a package, package type information indicating a type of a package, a redelivery flag (redelivery information) indicating whether or not redelivery is requested for a package, a redelivery desired date and time indicating a date and time when a recipient desires redelivery of a package, and an absence flag (absence information) indicating whether or not a recipient of a package is absent on a scheduled delivery date of a package. A type of package indicates content of a package such as a fragile article, a food product, or a book.

The controller 23 is, for example, a CPU, and controls the entire delivery management server 2. The controller 23 updates a redelivery flag (redelivery information) or an absence flag (absence information) for a package ID. The controller 23 updates the redelivery flag and a redelivery desired date and time of delivery information stored in the memory 22 based on redelivery request information received by the communication part 21. Further, the controller 23 updates the absence flag of delivery information stored in the memory 22 based on absence notification information received by the communication part 21.

In a case where redelivery is not requested by a recipient, the controller 23 turns off the redelivery flag. Further, in a case where redelivery request information is received and redelivery is requested by a recipient, the controller 23 turns on the redelivery flag. Further, in a case where redelivery request information received from the terminal 1 includes a redelivery desired date and time, the controller 23 updates a redelivery desired date and time.

Further, in a case where a recipient does not notify that the recipient is absent on a scheduled delivery date, the controller 23 turns off the absence flag. Furthermore, in a case where absence notification information is received, and it is notified from a recipient that the recipient is absent on a scheduled delivery date, the controller 23 turns on the absence flag.

Further, in a case where a delivery information request is received by the communication part 21, the controller 23 reads delivery information corresponding to a package ID included in the delivery information request from the memory 22, and transmits the read delivery information to the smart glasses 3 via the communication part 21.

The smart glasses 3 are a glasses type wearable device worn on the head of the user. Here, the user is a worker who sorts or delivers a package. The user wears the smart glasses 3 and performs work.

The smart glasses 3 illustrated in FIGS. 1 and 2 includes a camera 31, a controller 32, a communication part 33, and a display part 34.

The camera 31 photographs a visual field of the user. The camera 31 is provided on the right side of a main body of the smart glasses 3, and photographs a view in front of the user wearing the smart glasses 3. An angle of view and a focal length of the camera 31 are set to be substantially the same as a visual field of the user. For this reason, an image acquired by the camera 31 is substantially the same as scenery the user sees with naked eyes. The camera 31 outputs a captured image to the controller 32.

The controller 32 acquires an image captured by the camera 31. The controller 32 recognizes a package that is a work target of the user and a hand of the user from the acquired image by image recognition processing. The controller 32 determines whether or not the user is in a state of being about to carry a package based on a positional relationship between the recognized package and the recognized hand. At this time, in a case where the recognized package is located between a position of the recognized right hand of the user and a position of the recognized left hand of the user, the controller 32 determines that the user is in a state of being about to carry the package. A package that the user is about to carry is a package as a work target of the user, and is a package that the user starts carrying.

In a case where it is determined that the user is in a state of being about to carry a package, the controller 32 recognizes a package ID for identifying the package from the acquired image by image recognition processing. At this time, the controller 32 recognizes a package ID of the package between a position of the recognized right hand of the user and a position of the recognized left hand of the user.

The communication part 33 transmits a delivery information request for requesting delivery information regarding a package corresponding to a package ID recognized by the controller 32 to the delivery management server 2. Further, the communication part 33 receives requested delivery information from the delivery management server 2.

The controller 32 generates alert information to be presented to the user based on delivery information received by the communication part 33. In a case where a redelivery flag (redelivery information) included in delivery information received by the communication part 33 indicates that redelivery is requested, or in a case where an absence flag (absence information) included in delivery information received by the communication part 33 indicates that a recipient is absent on a scheduled delivery date, the controller 32 generates alert information.

In a case where a redelivery flag (redelivery information) included in delivery information received by the communication part 33 indicates that redelivery is requested, the controller 32 generates alert information indicating that redelivery is requested for a recognized package. Further, in a case where an absence flag (absence information) included in delivery information received by the communication part 33 indicates that a recipient is absent on a scheduled delivery date, the controller 32 generates alert information indicating that the recipient is absent on the scheduled delivery date of a recognized package.

Further, the controller 32 outputs the generated alert information. At this time, the controller 32 outputs the alert information to the display part 34.

The display part 34 is a light transmissive display, and displays alert information as augmented reality in a visual field of the user. For example, the display part 34 displays alert information in front of the right eye of the user wearing the smart glasses 3.

Subsequently, alert information presentation processing by the smart glasses 3 in the first embodiment of the present disclosure will be described.

Figure 4:
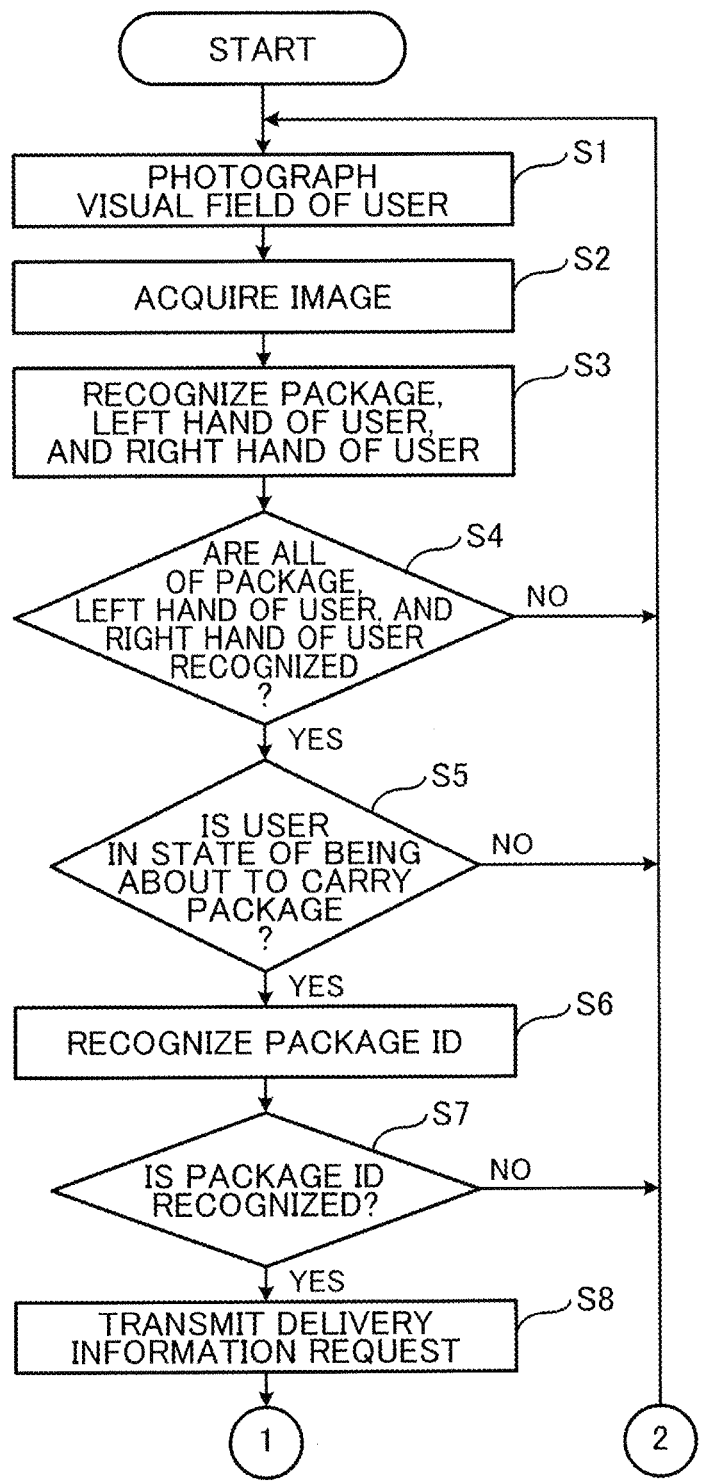
FIG. 4 is a first flowchart for describing alert information presentation processing by the smart glasses in the first embodiment of the present disclosure.
Figure 5:
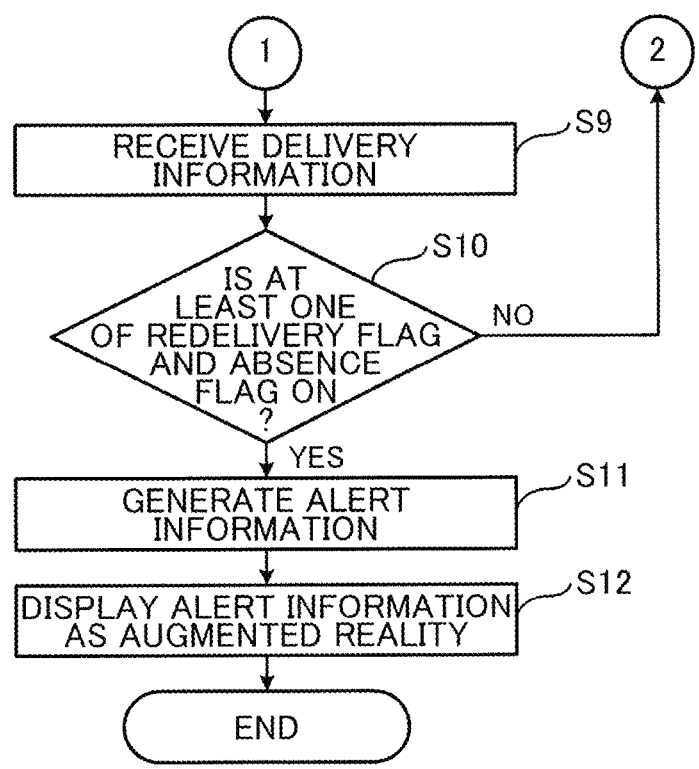
FIG. 5 is a second flowchart for describing the alert information presentation processing by the smart glasses in the first embodiment of the present disclosure.

FIG. 4 is a first flowchart for describing the alert information presentation processing by the smart glasses 3 in the first embodiment of the present disclosure, and FIG. 5 is a second flowchart for describing the alert information presentation processing by the smart glasses 3 in the first embodiment of the present disclosure.

First, in step S1, the camera 31 photographs a visual field of the user. During work of the user, the camera 31 continuously photographs a visual field of the user.

Next, in step S2, the controller 32 acquires an image obtained by the camera 31 shooting a visual field of the user from the camera 31.

Next, in step S3, the controller 32 recognizes a package as a work target of the user, the left hand of the user, and the right hand of the user from the acquired image by image recognition processing.

Figure 6:
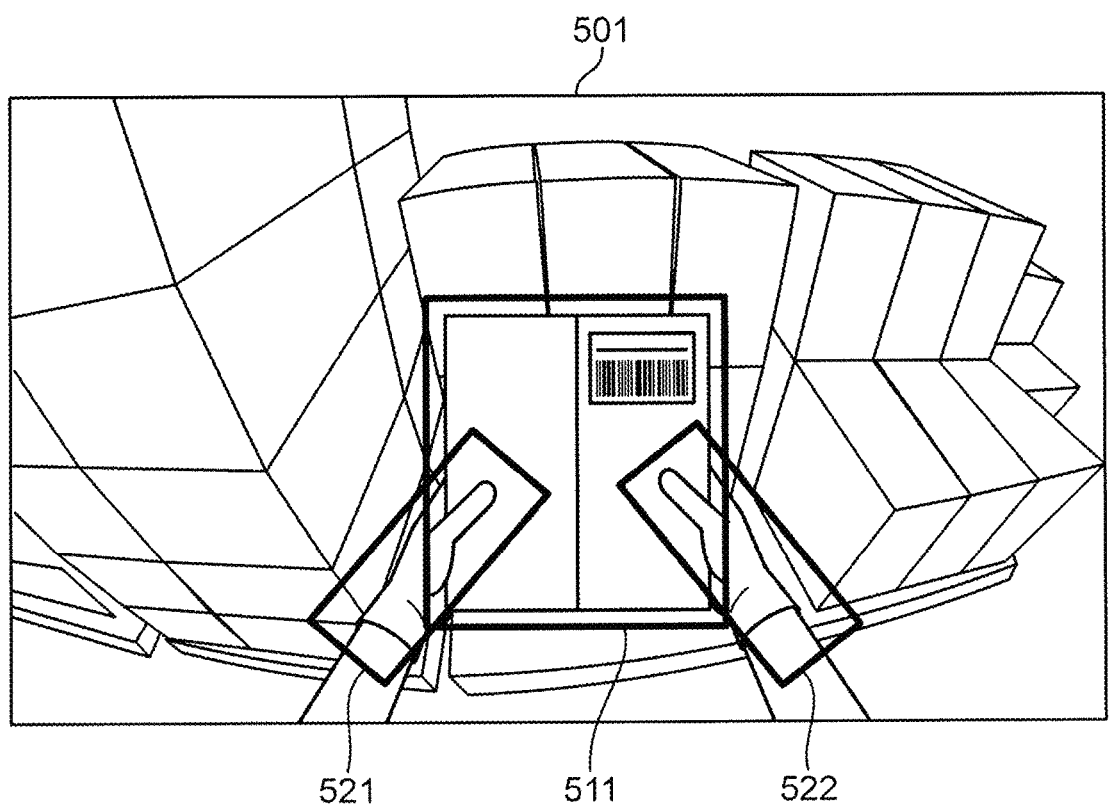
FIG. 6 is a diagram illustrating an example of an image captured by a camera when the user is about to carry a package.

FIG. 6 is a diagram illustrating an example of an image captured by the camera 31 when the user is about to carry a package.

When carrying a package, the user grips the package with both hands. At this time, the thumb of the left hand and the thumb of the right hand of the user are placed on an upper surface of the package, and the package is between the left hand and the right hand of the user. That is, in a case where a package is located between a position of the right hand of the user and a position of the left hand of the user, it can be determined that the user is in a state of being about to carry the package.

The controller 32 recognizes a package as a work target of the user, the left hand of the user, and the right hand of the user from an image captured by the camera 31. In FIG. 6, a package recognized from an image 501 is represented by a rectangular frame line 511, the left hand of the user recognized from the image 501 is represented by a rectangular frame line 521, and the right hand of the user recognized from the image 501 is represented by a rectangular frame line 522.

The controller 32 performs image recognition processing by using an image recognition model machine-learned so as to recognize a package, the left hand of the user, and the right hand of the user from an image. The controller 32 inputs an image captured by the camera 31 to a machine-learned image recognition model, and acquires a recognition result from the image recognition model. A recognition result shows a position of a package on the image, a position of the left hand of the user, and a position of the right hand of the user.

Note that examples of machine learning include supervised learning in which a relationship between input and output is learned using training data in which a label (output information) is assigned to input information, unsupervised learning in which a data structure is constructed only by unlabeled input, semi-supervised learning in which both labeled and unlabeled input are handled, and reinforcement learning in which an action that maximizes a reward is learned by trial and error. Further, specific methods of machine learning include a neural network (including deep learning using a multilayer neural network), genetic programming, a decision tree, a Bayesian network, and a support vector machine (SVM). In machine learning of an image recognition model, any of the specific examples described above is preferably used.

Further, the controller 32 may recognize a package, the left hand of the user, and the right hand of the user from an image by pattern matching.

Returning to FIG. 4, next, in step S4, the controller 32 determines whether or not all of a package, the left hand of the user, and the right hand of the user are recognized from an image. Here, in a case where it is determined that any one of the package, the left hand of the user, and the right hand of the user is recognized from the image, in a case where it is determined that any two of the package, the left hand of the user, and the right hand of the user are recognized from the image, or in a case where it is determined that all of the package, the left hand of the user, and the right hand of the user are not recognized from the image (NO in step S4), the processing returns to step S1.

On the other hand, in a case where it is determined that all of the package, the left hand of the user, and the right hand of the user are recognized from the image (YES in step S4), the controller 32 determines whether or not the user is in a state of being about to carry the package in step S5. At this time, in a case where the recognized package is located between a position of the recognized right hand of the user and a position of the recognized left hand of the user, the controller 32 determines that the user is in a state of being about to carry the package. In the image 501 illustrated in FIG. 6, since the package is located between a position of the right hand of the user and a position of the left hand of the user, it is determined that the user is in a state of being about to carry the package. On the other hand, in a case where the recognized package is not located between the position of the recognized right hand of the user and the position of the recognized left hand of the user, the controller 32 determines that the user is not in a state of being about to carry the package.

Here, in a case where it is determined that the user is not in a state of being about to carry the package (NO in step S5), the processing returns to step S1.

On the other hand, in a case where it is determined that the user is in a state of being about to carry the package (YES in step S5), in step S6, the controller 32 recognizes a package ID for identifying the package from the acquired image by image recognition processing.

Figure 7:
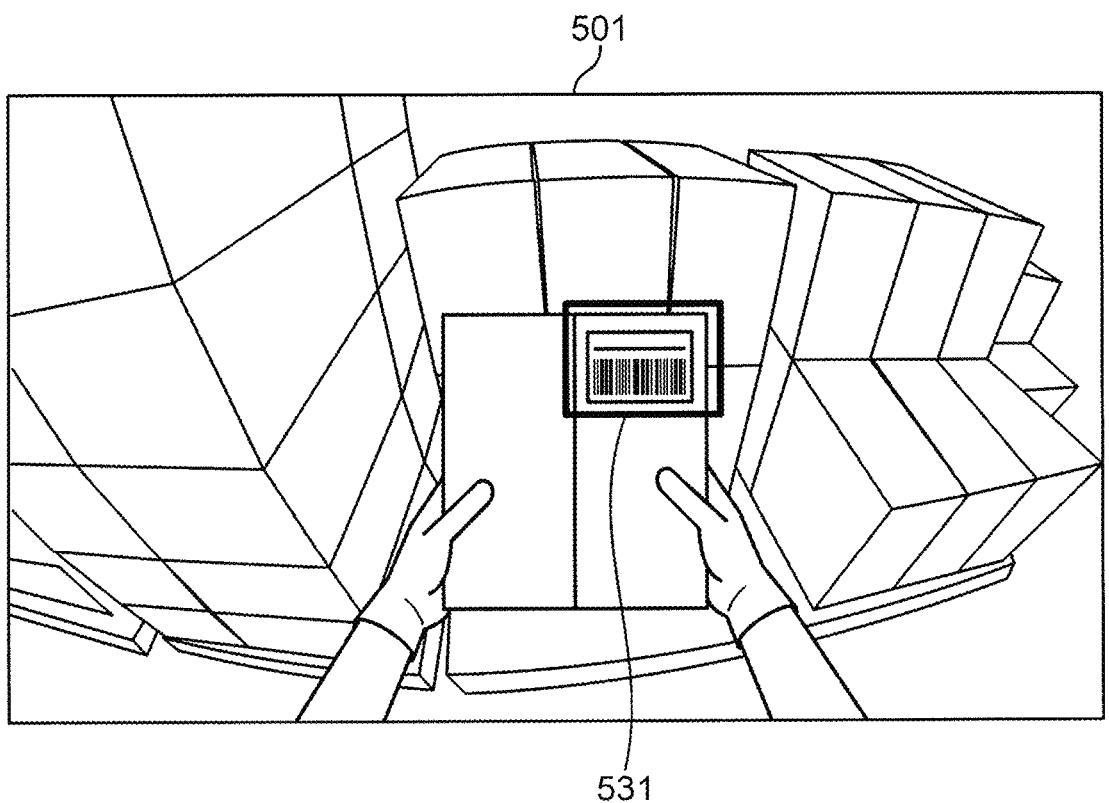
FIG. 7 is a diagram illustrating an example of an image captured by the camera when a package ID is recognized.

FIG. 7 is a diagram illustrating an example of an image captured by the camera 31 when a package ID is recognized.

A barcode indicating a package ID is adhered to an upper surface of a package. The controller 32 recognizes a barcode of a package that the user is about to carry, that is, a package as a work target, from an image captured by the camera 31, and reads a package ID from the recognized barcode to recognize the package ID. In FIG. 7, a barcode indicating a package ID recognized from the image 501 is represented by a rectangular frame line 531.

Note that, in the present embodiment, a package ID is indicated by a barcode, but the present disclosure is not particularly limited to this, and the package ID may be indicated by a two-dimensional code. In this case, the controller 32 may recognize a package ID by recognizing a two-dimensional code from an image captured by the camera 31 and reading the package ID from the recognized two-dimensional code.

Returning to FIG. 4, next, in step S7, the controller 32 determines whether or not a package ID is recognized from the image. Here, in a case where it is determined that a package ID is not recognized from the image (NO in step S7), the processing returns to step S1.

On the other hand, in a case where it is determined that a package ID is recognized from the image (YES in step S7), in step S8, the communication part 33 transmits, to the delivery management server 2, a delivery information request for requesting delivery information regarding a package corresponding to the package ID recognized by the controller 32. The delivery information request includes the package ID. The communication part 21 of the delivery management server 2 receives the delivery information request transmitted by the smart glasses 3. The controller 23 of the delivery management server 2 reads, from the memory 22, delivery information corresponding to the package ID included in the delivery information request received by the communication part 21. The communication part 21 of the delivery management server 2 transmits the delivery information read by the controller 23 to the smart glasses 3.

Next, in step S9, the communication part 33 receives the delivery information transmitted by the delivery management server 2.

Next, in step S10, the controller 32 determines whether or not at least one of a redelivery flag and an absence flag included in the delivery information received by the communication part 33 is on. Here, in a case where it is determined that both the redelivery flag and the absence flag are off (NO in step S10), the processing returns to step S1.

On the other hand, in a case where it is determined that at least one of the redelivery flag and the absence flag is on (YES in step S10), the controller 32 generates alert information in step S11. At this time, in a case where it is determined that the redelivery flag is on, the controller 32 generates alert information indicating that redelivery is requested for the package that the user is about to carry. Further, in a case where it is determined that the absence flag is on, the controller 32 generates alert information indicating that a recipient is absent on a scheduled delivery date of the package that the user is about to carry. Note that, in a case where it is determined that both the redelivery flag and the absence flag are on, the controller 32 may generate both alert information indicating that redelivery is requested for the package that the user is about to carry and alert information indicating that a recipient is absent on a scheduled delivery date of the package that the user is about to carry.

Next, in step S12, the display part 34 displays the alert information in a visual field of the user as augmented reality.

Figure 8:
FIG. 8 is a diagram illustrating an example of alert information displayed on a display part of the smart glasses in the present first embodiment.

FIG. 8 is a diagram illustrating an example of the alert information displayed on the display part 34 of the smart glasses 3 in the present first embodiment.

Alert information 601 illustrated in FIG. 8 indicates in characters that redelivery is requested for a package that the user is about to carry. The alert information 601 is displayed as augmented reality on a real environment that the user is viewing. For this reason, the user can know that attention is required for the package that the user is about to carry by looking at the alert information 601.

Note that, in the present first embodiment, the delivery information may include a redelivery desired date and time indicating a date and time when a recipient desires redelivering of a package. In a case where a redelivery flag (redelivery information) included in delivery information received by the communication part 33 indicates that redelivery is requested, the controller 32 may determine a loading place where a package is loaded based on a redelivery desired date and time and a current date and time included in the received delivery information. Then, the controller 32 may generate loading place presentation information for presenting the determined loading place to the user, and output the generated loading place presentation information.

Figure 9:
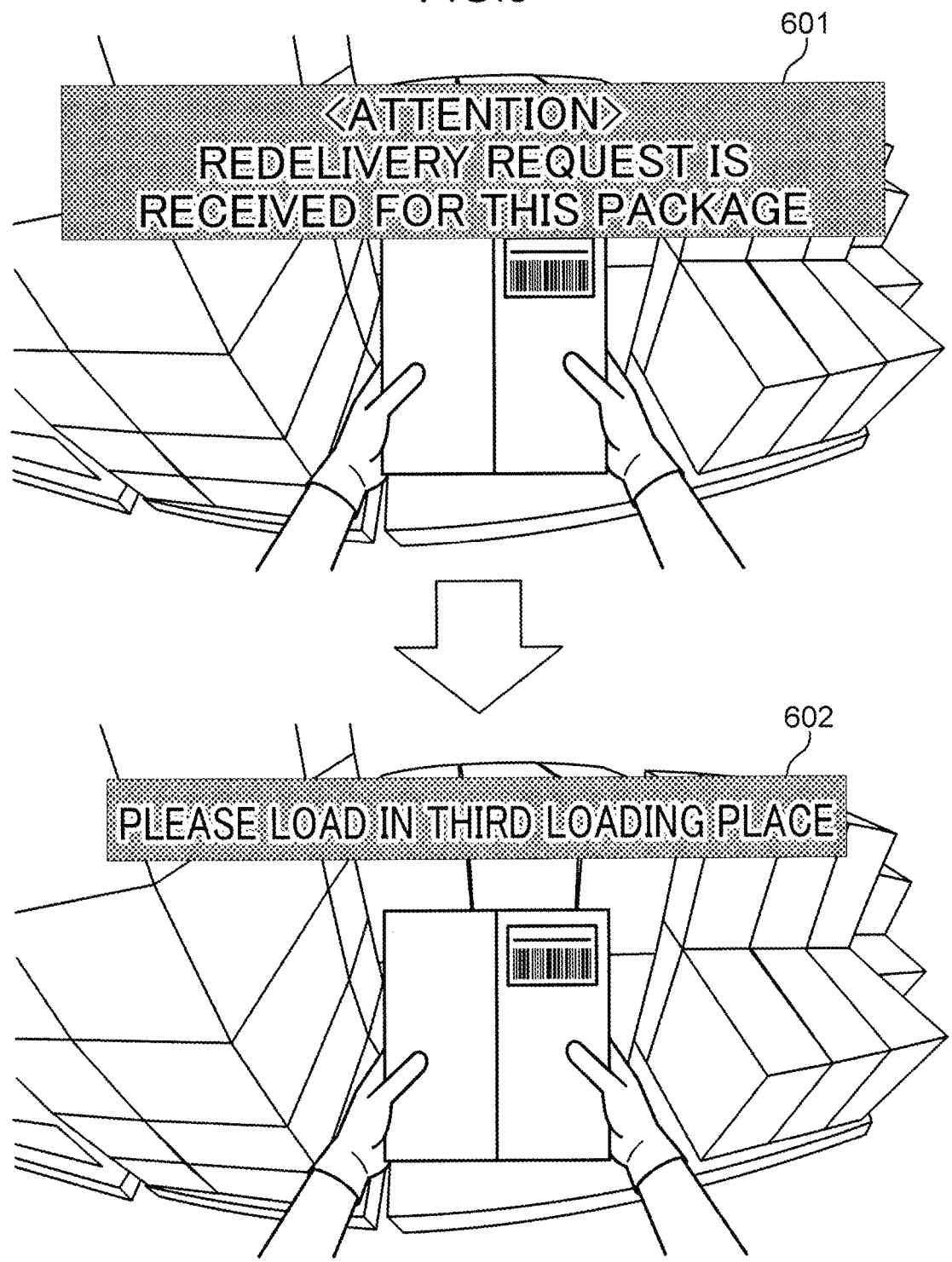
FIG. 9 is a diagram illustrating an example of loading place presentation information displayed after alert information indicating that redelivery is requested for a package that the user is about to carry is displayed in a variation of the present first embodiment.

FIG. 9 is a diagram illustrating an example of the loading place presentation information displayed after the alert information indicating that redelivery is requested for a package that the user is about to carry is displayed in a variation of the present first embodiment.

After outputting the alert information indicating that redelivery is requested for a package that the user is about to carry, the controller 32 may determine a loading place where the package is loaded based on a redelivery desired date and time and a current date and time. For example, a work place of the user includes a first loading place where a package whose redelivery desired date and time are within three hours from a current date and time is loaded, a second loading place where a package whose redelivery desired date and time exceed three hours from the current date and time is loaded, and a third loading place where a package whose the date indicated by redelivery desired date and time are different from the date indicated by the current date and time is loaded. For example, in a case where a redelivery desired date and time of a package that the user is about to carry is within three hours from a current date and time, the controller 32 may determine a loading place where the package is loaded as the first loading place.

As illustrated in FIG. 9, after displaying the alert information 601 indicating that redelivery is requested for a package that the user is about to carry, the display part 34 displays loading place presentation information 602 for presenting a loading place to the user.

The loading place presentation information 602 illustrated in FIG. 9 indicates in characters a loading place of a package for which redelivery is requested. The loading place presentation information 602 is displayed as augmented reality on a real environment that the user is viewing. For this reason, the user can know a loading place of a package that the user is about to carry by looking at the loading place presentation information 602. As described above, after the alert information indicating that redelivery is requested for a package that the user is about to carry is presented to the user, a loading place of the package that the user is about to carry is presented to the user. Therefore, when the user is about to carry a package for which redelivery is requested, the user can be guided to place the package at a predetermined loading place instead of returning the package to an original place.

Second Embodiment

In the first embodiment described above, the alert information for calling attention for a package is displayed as augmented reality in a case where the user is in a state of being about to carry the package, and a redelivery flag (redelivery information) included in delivery information indicates that redelivery is requested, or an absence flag (absence information) included in the delivery information indicates that a recipient is absent on a scheduled delivery date. On the other hand, in a second embodiment, in a case where the user is in a state of being about to carry a package and a position of a destination indicated by destination information included in delivery information and a current position of the smart glasses are separated from each other by a predetermined distance or more, alert information for calling attention for the package is displayed as augmented reality.

Figure 10:
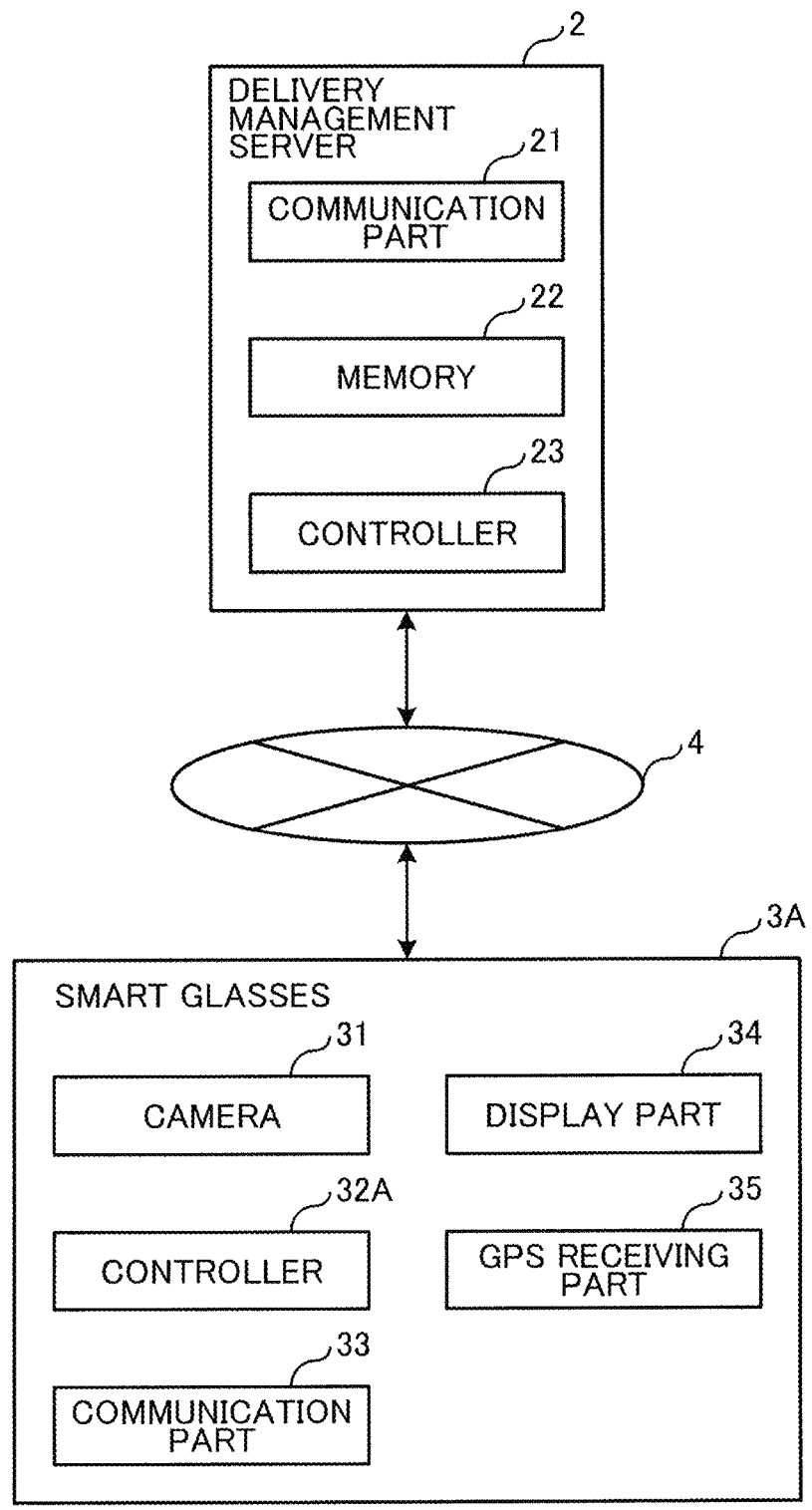
FIG. 10 is a diagram illustrating an example of the configuration of the delivery system according to a second embodiment of the present disclosure.
Figure 11:
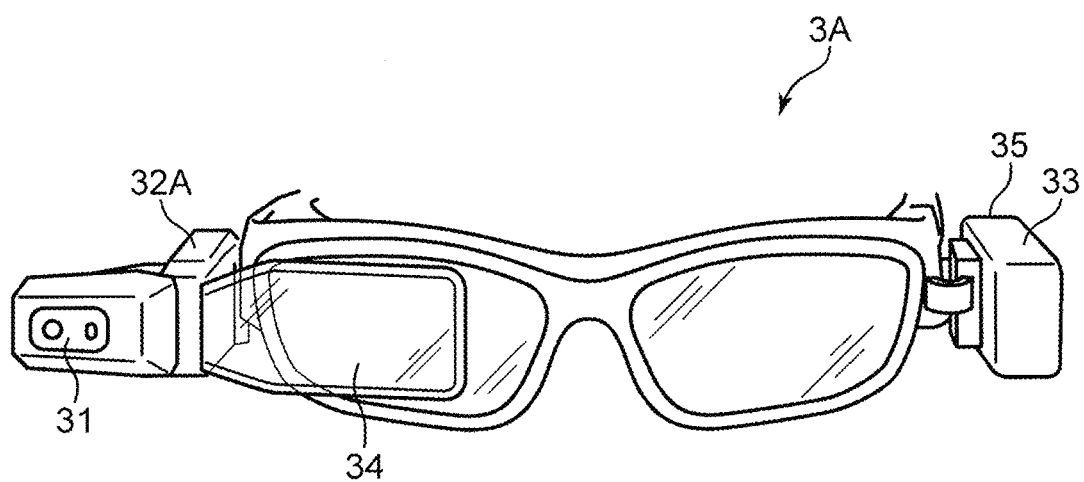
FIG. 11 is a diagram illustrating an appearance of the smart glasses illustrated in FIG. 10.

FIG. 10 is a diagram illustrating an example of the configuration of the delivery system according to a second embodiment of the present disclosure, and FIG. 11 is a diagram illustrating an appearance of smart glasses 3A illustrated in FIG. 10. The delivery system illustrated in FIG. 10 includes the delivery management server 2 and the smart glasses 3A. In the present second embodiment, the same configuration as that in the first embodiment will be denoted by the same reference sign as that in the first embodiment, and will be omitted from description. Further, in the present second embodiment, the delivery system may include the terminal 1 in the first embodiment, and the smart glasses 3A may have a function of the smart glasses 3 in the first embodiment.

The smart glasses 3A are a glasses type wearable device worn on the head of the user. Here, the user is a worker who sorts or delivers a package. The user wears the smart glasses 3A to perform work.

The smart glasses 3A illustrated in FIGS. 10 and 11 include the camera 31, a controller 32A, the communication part 33, the display part 34, and a global positioning system (GPS) receiving part 35.

The GPS receiving part 35 acquires a current position of the smart glasses 3A by receiving a GPS signal transmitted from a GPS satellite. The GPS receiving part 35 is an example of a current position acquisition part.

The controller 32A acquires an image captured by the camera 31. The controller 32A recognizes a package as a work target of the user and a hand of the user from the acquired image by image recognition processing. The controller 32A determines whether or not the user is in a state of being about to carry a package based on a positional relationship between the recognized package and the recognized hand. At this time, in a case where the recognized package is located between a position of the recognized right hand of the user and a position of the recognized left hand of the user, the controller 32A determines that the user is in a state of being about to carry the package.

In a case where it is determined that the user is in a state of being about to carry a package, the controller 32A recognizes a package ID for identifying the package from the acquired image by image recognition processing.

The controller 32A generates alert information to be presented to the user based on delivery information received by the communication part 33. The delivery information includes destination information indicating a destination of a package. In a case where a position of a destination indicated by destination information included in delivery information received by the communication part 33 and a current position acquired by the GPS receiving part 35 are separated from each other by a predetermined distance or more, the controller 32A generates alert information indicating that there is a possibility that a package that the user is about to carry is incorrect.

Further, the controller 32A outputs the generated alert information. At this time, the controller 32A outputs the alert information to the display part 34.

Subsequently, alert information presentation processing by the smart glasses 3A in the second embodiment of the present disclosure will be described.

Figure 12:
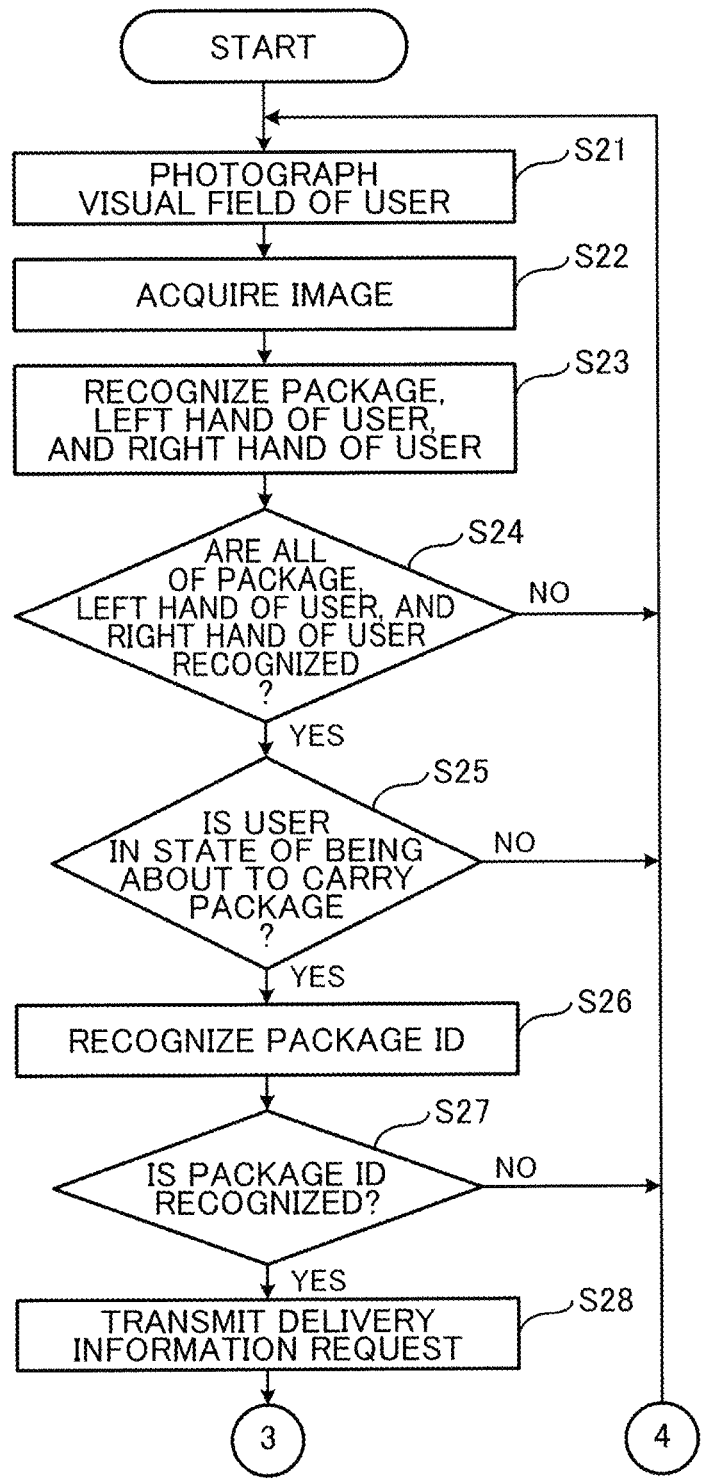
FIG. 12 is a first flowchart for describing the alert information presentation processing by the smart glasses in the second embodiment of the present disclosure.
Figure 13:
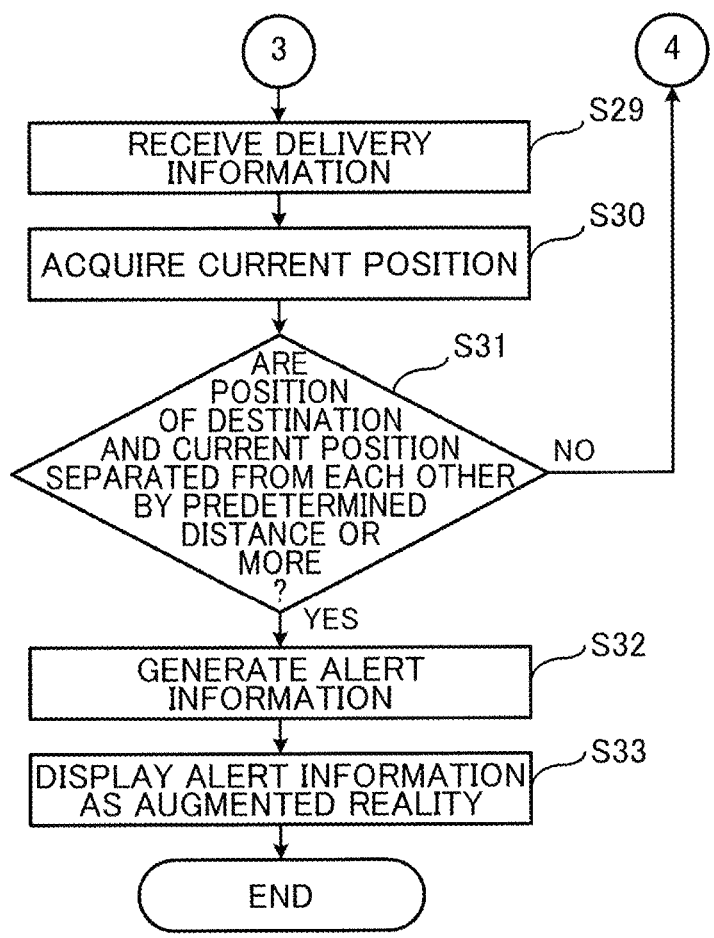
FIG. 13 is a second flowchart for describing the alert information presentation processing by the smart glasses in the second embodiment of the present disclosure.

FIG. 12 is a first flowchart for describing the alert information presentation processing by the smart glasses 3A in the second embodiment of the present disclosure, and FIG. 13 is a second flowchart for describing the alert information presentation processing by the smart glasses 3A in the second embodiment of the present disclosure.

Note that processing in steps S21 to S29 illustrated in FIGS. 12 and 13 is the same as the processing in steps S1 to S9 illustrated in FIGS. 4 and 5, and thus will be omitted from description.

Next, in step S30, the GPS receiving part 35 acquires a current position of the smart glasses 3A. The GPS receiving part 35 outputs the acquired current position to the controller 32A. The current position is represented, for example, by latitude and longitude.

Next, in step S31, the controller 32A determines whether or not a position of a destination indicated by destination information included in delivery information received by the communication part 33 and the current position acquired by the GPS receiving part 35 are separated from each other by a predetermined distance or more. The destination is represented by, for example, an address. The controller 32A converts an address of the destination into latitude and longitude, and compares the latitude and longitude of the destination with latitude and longitude of the current position. The predetermined distance is, for example, ten meters.

Here, in a case where it is determined that the position of the destination and the current position are not separated by the predetermined distance or more (NO in step S31), the processing returns to step S21.

On the other hand, in a case where it is determined that the position of the destination and the current position are separated from each other by the predetermined distance or more (YES in step S31), in step S32, the controller 32A generates alert information indicating that there is a possibility that a package that the user is about to carry is incorrect.

Next, in step S33, the display part 34 displays the alert information in a visual field of the user as augmented reality.

Figure 14:
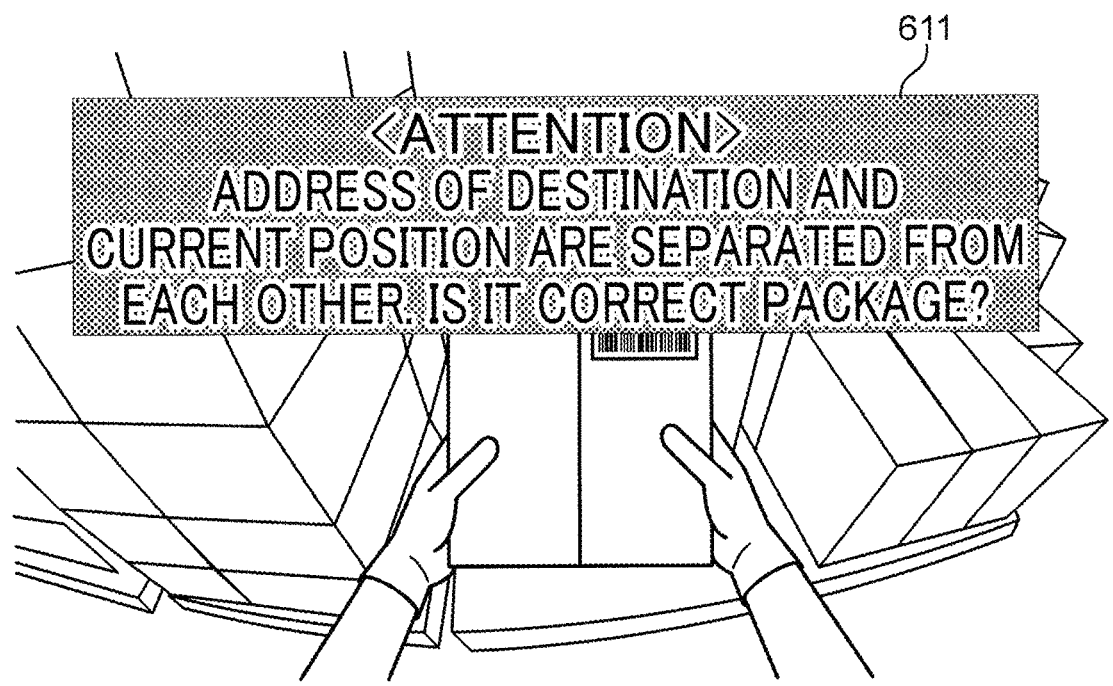
FIG. 14 is a diagram illustrating an example of the alert information displayed on the display part of the smart glasses in the present second embodiment.

FIG. 14 is a diagram illustrating an example of the alert information displayed on the display part 34 of the smart glasses 3A in the present second embodiment.

Alert information 611 illustrated in FIG. 14 indicates in characters that an address of a destination and a current position of the user are separated from each other by a predetermined distance or more and there is a possibility that a package that the user is about to carry is incorrect. The alert information 611 is displayed as augmented reality on a real environment that the user is viewing. For this reason, the user can know that attention is required for the package that the user is about to carry by looking at the alert information 611.

Note that although the display part 34 displays alert information in the present first and second embodiments, the present disclosure is not particularly limited to this. The smart glasses 3 and 3A may include a speaker, and the controllers 32 and 32A may output alert information to the speaker. The speaker may output the alert information by voice.

Further, in the present first and second embodiments, the controllers 32 and 32A may stop output of the alert information in a case where a predetermined period of time elapses after the alert information is output.

Further, in the present first and second embodiments, after outputting alert information, the controllers 32 and 32A may recognize a package as a work target of the user and a hand of the user from an acquired image by image recognition processing. Then, the controllers 32 and 32A may determine whether or not the user releases the hand from the package based on a positional relationship between the recognized package and the recognized hand. At this time, in a case where the recognized package is not located between a position of the recognized right hand of the user and a position of the recognized left hand of the user, the controllers 32 and 32A may determine that the user releases the hand from the package. Then, in a case where it is determined that the user releases the hand from the package, the controllers 32 and 32A may stop the output of the alert information. By the above, the alert information is no longer displayed on the display part 34.

Further, in the present first and second embodiments, the controllers 32 and 32A may generate recognized package presentation information for presenting a recognized package to the user in an identifiable manner, and output the generated recognized package presentation information.

Figure 15:
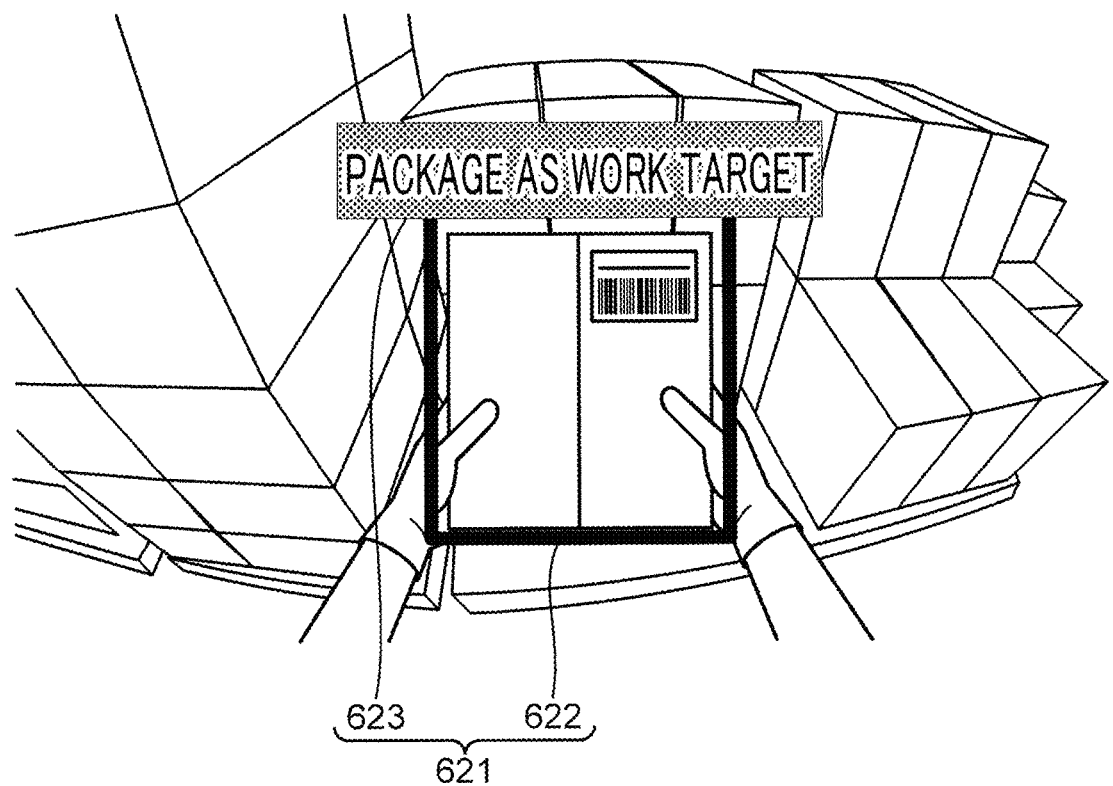
FIG. 15 is a diagram illustrating an example of recognized package presentation information displayed on the display part of the smart glasses in a variation of the present first and second embodiments.

FIG. 15 is a diagram illustrating an example of recognized package presentation information displayed on the display part 34 of the smart glasses 3 and 3A in a variation of the present first and second embodiments.

There is a possibility that a package different from a package as a work target is recognized as a package that the user is about to carry. In view of the above, the controllers 32 and 32A may generate recognized package presentation information for presenting a recognized package to the user in an identifiable manner, and output the generated recognized package presentation information to the display part 34. Recognized package presentation information 621 illustrated in FIG. 15 includes a frame line 622 surrounding a recognized package between a position of a recognized right hand of the user and a position of a recognized left hand of the user, and a character image 623 indicating that the package is a package as a work target. The recognized package presentation information 621 is displayed as augmented reality on a real environment that the user is viewing. For this reason, the user can know whether or not the package as a work target is the same as a package recognized as a package that the user is about to carry by the smart glasses 3 and 3A by looking at the recognized package presentation information 621. By the above, it is possible to prevent a package that is not a work target from being erroneously recognized as a package that the user is about to carry by the smart glasses 3 and 3A.

Note that after outputting the recognized package presentation information 621, the controllers 32 and 32A may further recognize movement of a hand of the user from an image by image recognition processing. Then, in a case where the controllers 32 and 32A recognize movement of the hand waving sideways, image recognition processing of recognizing the package as a work target of the user and the hand of the user from an acquired image may be performed again.

Further, each of the above-described embodiments is described on the premise of a site where a worker delivers a package, but the present disclosure is not limited to this. Each of the above-described embodiments is also applicable to, for example, a construction site where a worker installs a construction member at a predetermined place.

In that case, the system includes a construction member management server and smart glasses. The construction member management server manages a construction member ID for identifying each construction member and information on handling of each construction member in association with each other. Here, the information on handling of each building member is, for example, an installation place, a weight, or the like of each building member. A communication part of the smart glasses may receive information on handling of a building member from the building member management server. A controller of the smart glasses may generate alert information to be presented to the user based on the received information on handling of a building member, and output the generated alert information. The alert information is, for example, information indicating an installation place, a weight, or the like of a building member.

Since alert information is presented at a time point where a worker is about to carry a building member as each of the above-described embodiments is applied at a building site, it is possible to reduce installation errors and construction errors of a building member and improve work efficiency.

In each of the above embodiments, each constituent element may be implemented by being configured with dedicated hardware or by execution of a software program suitable for each constituent element. Each constituent element may be implemented by a program execution unit, such as a CPU or a processor, reading and executing a software program recorded in a recording medium such as a hard disk or a semiconductor memory. Further, the program may be carried out by another independent computer system by being recorded in a recording medium and transferred or by being transferred via a network.

Some or all functions of the device according to the embodiment of the present disclosure are implemented as large scale integration (LSI), which is typically an integrated circuit. These may be individually integrated into one chip, or may be integrated into one chip so as to include some or all of them. Further, circuit integration is not limited to LSI, and may be implemented by a dedicated circuit or a general purpose processor. A field programmable gate array (FPGA), which can be programmed after manufacturing of LSI, or a reconfigurable processor in which connection and setting of circuit cells inside LSI can be reconfigured may be used.

Further, some or all functions of the device according to the embodiment of the present disclosure may be implemented by a processor such as a CPU executing a program.

Further, all numbers used above are illustrated to specifically describe the present disclosure, and the present disclosure is not limited to the illustrated numbers.

Further, order in which steps illustrated in the above flowchart are executed is for specifically describing the present disclosure, and may be any order other than the above order as long as a similar effect is obtained. Further, some of the above steps may be executed simultaneously (in parallel) with other steps.

The technique according to the present disclosure can reduce delivery errors and delivery loss and can improve delivery efficiency, and thus is useful as a technique for supporting a package carrying work by the user.

The invention claimed is:

1. A wearable device worn on a head of a user, the wearable device comprising:
   a camera;
   a controller; and
   a communication part,
   wherein the camera photographs a visual field of the user, the controller:
   acquires an image captured by the camera;
   recognizes a package as a work target of the user and a hand of the user from the acquired image by image recognition processing;
   determines whether or not the user is in a state of being about to carry the package based on a positional relationship between the recognized package and the recognized hand; and
   recognizes a package ID for identifying the package from the acquired image by image recognition processing in a case where it is determined that the user is in a state of being about to carry the package,
   the communication part:
   transmits, to a delivery management server, a delivery information request for requesting delivery information regarding the package corresponding to the recognized package ID; and
   receives the requested delivery information from the delivery management server, and
   the controller:
   generates alert information to be presented to the user based on the received delivery information; and
   outputs the generated alert information.

2. The wearable device according to claim 1, wherein the controller determines that the user is in a state of being about to carry the package in a case where the recognized package is located between a position of a recognized right hand of the user and a position of a recognized left hand of the user.

3. The wearable device according to claim 1, wherein
   the delivery information includes redelivery information indicating whether or not redelivery is requested for the package or absence information indicating whether or not a recipient of the package is absent on a scheduled delivery date of the package,
   the delivery management server updates the redelivery information or the absence information with respect to the package ID, and
   the controller generates the alert information in a case where the redelivery information included in the received delivery information indicates that the redelivery is requested, or in a case where the absence information included in the received delivery information indicates that the recipient is absent on the scheduled delivery date.

4. The wearable device according to claim 3, wherein
   the delivery information includes a redelivery desired date and time indicating a date and time when a recipient desires redelivery of the package, and
   the controller:
   determines a loading place where the package is loaded based on the redelivery desired date and time included in the received delivery information and a current date and time in a case where the redelivery information included in the received delivery information indicates that the redelivery is requested;
   generates loading place presentation information for presenting the determined loading place to the user; and
   outputs the generated loading place presentation information.

5. The wearable device according to claim 1, further comprising a current position acquisition part that acquires a current position of the wearable device, wherein
   the delivery information includes destination information indicating a destination of the package, and
   the controller generates the alert information in a case where a position of the destination indicated by the destination information included in the received delivery information and the current position acquired by the current position acquisition part are separated from each other by a predetermined distance or more.

6. The wearable device according to claim 1, further comprising a display part, wherein
   the controller outputs the alert information to the display part, and
   the display part displays the alert information as augmented reality in a visual field of the user.

7. The wearable device according to claim 1, further comprising a speaker, wherein
   the controller outputs the alert information to the speaker, and
   the speaker outputs the alert information by voice.

8. The wearable device according to claim 1, wherein
   the controller:
   determines whether or not the user releases the hand from the package based on a positional relationship between the recognized package and the recognized hand; and
   stops output of the alert information in a case where it is determined that the user releases the hand from the package.

9. The wearable device according to claim 1, wherein
   the controller:
   generates recognized package presentation information for presenting the recognized package to the user in an identifiable manner; and
   outputs the generated recognized package presentation information.

10. An information processing method in a wearable device worn on a head of a user, the information processing method comprising:
    acquiring an image captured by a camera that photographs a visual field of the user;
    recognizing a package as a work target of the user and a hand of the user from the acquired image by image recognition processing;

determining whether or not the user is in a state of being about to carry the package based on a positional relationship between the recognized package and the recognized hand;

recognizing a package ID for identifying the package from the acquired image by image recognition processing in a case where it is determined that the user is in a state of being about to carry the package;

transmitting, to a delivery management server, a delivery information request for requesting delivery information regarding the package corresponding to the recognized package ID;

receiving the requested delivery information from the delivery management server;

generating alert information to be presented to the user based on the received delivery information; and outputting the generated alert information.

11. A non-transitory computer readable recording medium storing an information processing program that causes a computer to function to:

acquire an image captured by a camera that photographs a visual field of the user;

recognize a package as a work target of the user and a hand of the user from the acquired image by image recognition processing;

determine whether or not the user is in a state of being about to carry the package based on a positional relationship between the recognized package and the recognized hand;

recognize a package ID for identifying the package from the acquired image by image recognition processing in a case where it is determined that the user is in a state of being about to carry the package;

transmit, to a delivery management server, a delivery information request for requesting delivery information regarding the package corresponding to the recognized package ID;

receive the requested delivery information from the delivery management server;

generate alert information to be presented to the user based on the received delivery information; and output the generated alert information.

\* \* \* \* \*